United States Patent
Peiffer et al.

(10) Patent No.: US 6,276,161 B1
(45) Date of Patent: *Aug. 21, 2001

(54) MODULAR LOW PRESSURE DELIVERY VEHICLE AIR CONDITIONING SYSTEM

(75) Inventors: Larry Peiffer, Whitewater, WI (US); Terry Zeigler, Byron; William G. Guo, Davis Junction, both of IL (US)

(73) Assignee: Bergstrom, Inc., Rockford, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/467,330

(22) Filed: Dec. 20, 1999

Related U.S. Application Data

(62) Division of application No. 09/083,303, filed on May 22, 1998, now Pat. No. 6,038,877.

(51) Int. Cl.$^7$ .................................................. F25D 17/04
(52) U.S. Cl. ................................ 62/406; 62/244; 62/434
(58) Field of Search ............................ 62/406, 434, 244, 62/298, 239, 243, 435

(56) References Cited

U.S. PATENT DOCUMENTS

| | | | |
|---|---|---|---|
| 1,352,533 | * 9/1920 | Ross . | |
| 2,263,476 | 11/1941 | Sunday | 257/9 |
| 2,804,756 | 9/1957 | Faulhaber et al. | 62/117.1 |
| 3,216,216 | 11/1965 | Rowley | 62/204 |
| 4,217,764 | 8/1980 | Armbruster | 62/323 |
| 4,257,240 | 3/1981 | Christiansen et al. | 62/448 |
| 4,271,677 | 6/1981 | Harr | 62/127 |
| 4,551,986 | 11/1985 | Anderson et al. | 62/239 |
| 4,641,502 | 2/1987 | Aldrich et al. | 62/244 |
| 4,811,569 | 3/1989 | Welch et al. | 62/239 |
| 4,840,039 | 6/1989 | Takai | 62/244 |
| 4,890,463 | * 1/1990 | Cantoni | 62/239 |
| 4,909,046 | 3/1990 | Johnson | 62/244 |
| 5,222,372 | 6/1993 | DeRees et al. | 62/237 |
| 5,265,437 | * 11/1993 | Saperstein et al. | 62/243 |
| 5,408,843 | 4/1995 | Lukas et al. | 62/244 |
| 5,553,662 | 9/1996 | Longardner et al. | 165/202 |
| 5,609,037 | 3/1997 | Fischler | 62/239 |
| 5,899,086 | * 5/1999 | Noda et al. | 62/244 |
| 6,041,849 | * 3/2000 | Karl . | |

FOREIGN PATENT DOCUMENTS

| | | | |
|---|---|---|---|
| 12 31 728 | 1/1967 | (DE) . | |
| 42 05 681 | 8/1993 | (DE) | F24F/11/02 |
| 195 24 660 | 10/1996 | (DE) | B60H/1/00 |
| 195 28 776 | 2/1997 | (DE) | B60H/1/32 |
| 0675331 | * 10/1995 | (EP) . | |
| 2072318 | * 9/1981 | (GB) . | |
| 404320767 | * 11/1992 | (JP) . | |

* cited by examiner

Primary Examiner—Michael Powell Buiz
Assistant Examiner—Chen-Wen Jiang
(74) Attorney, Agent, or Firm—Leydig, Voit & Mayer, Ltd.

(57) ABSTRACT

A modular air conditioning system comprises a self-contained refrigeration power cell, a heat exchanger remotely located from the refrigeration power cell, and a low pressure refrigerant communication circuit operably coupling the refrigeration power cell to the heat exchanger. The refrigeration power cell comprises a compressor, a condenser, an expansion device, and an evaporator which are serially coupled to form a high pressure closed refrigeration circuit. A drive mechanism, such as an electric or hydraulic motor, or conventional belt, is coupled to the compressor. The low pressure refrigerant communication circuit thermally interfaces with the condenser to remove heat from the high pressure closed refrigeration circuit. Alternatively, this circuit thermally interfaces with the evaporator to remove heat from the low pressure refrigerant. This heat exchanger is adapted to mount in the cabin of an over-the-road or off-road vehicle. Preferably, a second heat exchanger and a second low pressure refrigerant communication circuit is included. This second circuit thermally interfaces with the condenser to remove heat from the refrigeration circuit.

17 Claims, 5 Drawing Sheets

MODULAR LOW PRESSURE DELIVERY VEHICLE AIR CONDITIONING SYSTEM

This application is a division of U.S. application Ser. No. 09/083,303 filed May 22, 1998 now U.S. Pat. No. 6,038,877.

FIELD OF THE INVENTION

This invention relates to vehicle air conditioning systems, and more particularly to over-the-road or off-road or off-road vehicle air conditioning systems utilizing in-dash delivery of air conditioned air.

BACKGROUND OF THE INVENTION

Over-the-road or off-road vehicles, such as semi-tractor trailers and construction vehicles, are increasingly utilized to satisfy the transportation and construction needs of our economy. These increased needs result in increased utilization of these vehicles to the point where many are operated seven days a week and upwards of eighteen (18) to twenty (20) hours a day with a two person crew or multiple shift operations. This increased utilization is not simply a vehicle statement, but also includes a human factor as these vehicles are operated by at least a driver and often times by a driving team consisting of two individuals who share the duty of operating the vehicle. Since these vehicles are operated so extensively, increased driver and passenger comfort is essential, both in terms of environment temperature and physical space within the vehicle cab. The need for environmental comfort during warm weather is satisfied through the use of an over-the-road or off-road vehicle air conditioning system, while the physical layout has been accommodated through new ergonomic interior designs, including reduced dash size, to maximize the available room within the vehicle cab for passenger occupation.

Typical over-the-road or off-road vehicle air conditioning systems are of the compressor type. These air conditioning systems utilize a compressor, which is driven by a belt coupled to the engine to compress a refrigerant vapor under high pressure which is then circulated through a condenser to remove heat from the compressed high pressure vapor and change it to a liquid state. The liquid refrigerant is then passed through an expansion valve which reduces the pressure on the refrigerant somewhat. This lower pressure refrigerant is then passed through an evaporator, which permits the return of the refrigerant to the vapor state, thereby removing heat from the air blown thereacross by an in-dash fan.

In a modern over-the-road or off-road vehicle, the main components of the refrigeration system, including the compressor and the condenser, are located remotely from the evaporator which is typically installed behind the dashboard air vents to provide cooling of the cabin air as described above, and from the condenser which is typically mounted with the vehicle radiator in the front of the engine compartment. Since the typical compressor vehicle air conditioning system is a closed loop system, the circulating high pressure refrigerant must be passed from the remotely located components within the engine compartment to the vehicle cab-located evaporator and to the forward engine compartment, radiator located condenser via expensive high pressure refrigeration hoses. A typical installation includes the compressor and condenser in the engine compartment of the over-the-road or off-road vehicle, and utilizes multiple high pressure refrigeration lines to couple these components through the firewall and into the cab behind the dash to the location of the evaporator, and to the radiator area of the engine compartment. Each of these high pressure refrigeration lines require high pressure couplings at each connection for the delivery and return of the high pressure refrigerant in the air conditioning system.

As can well be imagined, both from the above-description as well as from personal experiences with vehicular air conditioning systems, this typical installation arrangement for an over-the-road or off-road vehicle air conditioning system is severely prone to leaks of the high pressure refrigerant. These leaks occur at various locations, but are most frequent at the various couplings of the high pressure hose which routes the high pressure refrigerant from the condenser to the interior of the cab, under the dash, and to the location of the evaporator. Another frequent area for leaks occurs at the various couplings of the high pressure hose which routes the high pressure refrigerant from the compressor to the radiator area located condenser. These leaks result in a reduced efficiency of the air conditioning system, expensive recharging of the system with new refrigerant, as well as a hazard to the environment through the escape of the refrigerant. An increased consciousness of the environmental impact that escaped refrigerant has on the planet, as well as increased government regulation regarding the inadvertent release of refrigeration refrigerant, has placed an increased emphasis on overcoming these problems.

In addition to the problem of leaks within the air conditioning system, the use of this type of system requires that expensive high pressure refrigeration lines be utilized within the engine compartment, and between the engine compartment and the interior of the cab. In addition, expensive high pressure couplings must also be utilized in an attempt to reduce the potential for leaks and catastrophic failure of the air conditioning system due to a failed connection of the high pressure refrigeration lines. Also, because the refrigeration system is not closed until assembly of the vehicle takes place within the manufacturing assembly facility, the use of this type of system further burdens the assembly manufacturer by requiring that the initial purging and charging of the refrigeration system take place within the assembly plant of the vehicle itself. As mentioned above, since the use of refrigerant is a highly regulated process, requiring the manufacturing assembler to charge the refrigeration system greatly increases the cost associated with the manufacture of the vehicle.

In an attempt to overcome many of the above-mentioned problems, several manufacturers of over-the-road or off-road vehicle air conditioning systems have designed self-contained systems which include not only the compressor and condenser, but also the evaporator within a close proximity to one another thereby reducing the potential sources of refrigerant leak. However, such systems require a large dedicated block of space be set aside for the refrigeration system within, or within very close proximity to, the cab of the over-the-road or off-road vehicle. One such system is illustrated by U.S. Pat. No. 5,222,372 issued to Derees, et al. on Jun. 29, 1993 for a MODULAR VEHICLE AIR CONDITIONING/HEATER ASSEMBLY. This patent describes the modular air conditioning assembly as being contained in a housing enclosure which is carried by the vehicle in a recess formed by the interior body panel of the vehicle which separates the engine compartment from the passenger compartment, under the dashboard of the vehicle. However, while such a system may be feasible in a passenger vehicle having a large dashboard, such a system is currently not feasible for an over-the-road or off-road vehicle as there is not enough space under the dash for installation of such a large unit.

Other systems, in an attempt to reduce the distance between the main components of the air conditioning system and the evaporator, have gone to a roof mounted design, such as that described in U.S. Pat. No. 4,217,764 issued to Armbruster on Aug. 19, 1980 for a ROOF MOUNTED MOTOR VEHICLE AIR CONDITIONER. However, these roof-mounted systems are typically quite bulky, and require that a hole be cut into the roof of the vehicle to accommodate the cold air vents. As these systems mount on the roof of the vehicle, they also significantly increase the amount of wind drag over the vehicle. In an effort to reduce this drag, a cowling is often included which also increases the cost of the system. Additionally, the air vents which protrude down from the roof of the vehicle significantly impact the ergonomic design of the cab by reducing interior passenger occupation space, as well as increasing the potential of head injury. Additionally, the increased vibration and noise which may result from operating the refrigeration system directly above the head of the driver and occupant of the over-the-road or off-road vehicle further reduces the desirability of this type of system.

SUMMARY OF THE INVENTION

It is therefore an object of the invention to overcome many of these and other problems existing in the art. More specifically, it is an object of the instant invention to provide an over-the-road or off-road vehicle air conditioning system which has increased reliability and decreased impact to the environment. It is an additional object of the instant invention to provide an over-the-road or off-road vehicle air conditioning system which eliminates the necessity for evacuating and charging of the air conditioning system at the manufacturing assembly plant. Further, it is an object of the instant invention to provide an over-the-road or off-road vehicle air conditioning system which utilizes an in-dash heat exchange with the cab air while eliminating the necessity for high pressure refrigeration lines and high pressure couplings running to and from the cab compartment. It is an additional object of the instant invention to provide an over-the-road or off-road vehicle air conditioning system which is modular in design, allowing for remote location of the main refrigeration circuit. It is an additional object of the instant invention to provide an over-the-road or off-road vehicle air conditioning system which allows for location of the main air conditioning circuit outside of the engine compartment in other more convenient locations.

In view of these and other objects of the invention, it is a feature of the instant invention to provide an air conditioning system which utilizes a self-contained refrigeration system which is remotely located from the in-dash heat exchanger for the cabin air. It is a further feature of the instant invention that the remotely located self-contained portion of the air conditioning system contains all of the high pressure system components in a closed system having permanent connections therebetween. It is an additional feature of the instant invention that the in-dash heat exchanger located within the cabin of the over-the-road or off-road vehicle contain a low pressure refrigerant circuit which is utilized to cool the cabin air. It is a further feature of the instant invention that the low pressure refrigerant circuit interfaces with the high pressure, remotely located refrigerant system via a heat exchanger. Further, it is a feature of the instant invention that the air conditioning system also utilizes a low pressure refrigerant circuit to remove heat from the compressed refrigerant in the high pressure, remotely located self-contained modular circuit.

In view of the above, an embodiment of the air conditioning system for an over-the-road or off-road vehicle having an engine located in an engine compartment and an occupant cabin, the occupant cabin having a dashboard including air flow vents and a vent fan included, the system of the present invention comprises a refrigeration power cell, a first heat exchanger adapted to be mounted in the dashboard of the occupant cabin, and a first low pressure refrigerant communication circuit operably coupling the first heat exchanger to the refrigeration power cell.

In this system the refrigeration power cell comprises a high pressure condenser-based refrigeration circuit. This circuit has a compressor, a condenser, an expansion device, and an evaporator. Also included is a circulation circuit which supplies low pressure refrigerant to the low pressure refrigerant communication circuit. The evaporator and the circulation circuit are in thermal communications whereby heat is removed from the low pressure refrigerant. Preferably, the circulation circuit comprises a low pressure refrigerant pump and an input and output low pressure refrigerant coupling. This pump circulates the low pressure refrigerant through this heat exchanger across which the vent fan blows air to be cooled. This produces cooled air which flows through the vents and into the occupant cabin to cool same.

Preferably, the system of the present invention further comprises a second heat exchanger adapted to be mounted in the engine compartment, and a second low pressure refrigerant communication circuit operably coupling this second heat exchanger to the refrigeration power cell. Additionally, the refrigeration power cell further comprises a second circulation circuit supplying a second low pressure refrigerant to this second low pressure refrigerant communication circuit. The condenser and this second circulation means are preferably in thermal communications whereby heat is removed from the refrigeration power cell by the second low pressure refrigerant. In a system wherein the engine includes a radiator and an engine fan within the engine compartment, this second low pressure refrigerant circulates through the second heat exchanger across which the engine fan draws air to remove heat from this second heat exchanger thereby cooling the second low pressure refrigerant.

In an embodiment of the instant invention, the refrigeration power cell further comprises a sub-cooler thermally coupling the low temperature input of the compressor to the high temperature output of the compressor. This heat exchange increases the efficiency of the compressor. Additionally, the refrigeration power cell further comprises a drier interposed between the condenser and the expansion device. This drier removes water from the refrigeration circuit.

In an alternate embodiment of the instant invention, a modular air conditioning system comprises a self-contained refrigeration power cell, a heat exchanger remotely located from the refrigeration power cell, and a low pressure refrigerant communication circuit. This low pressure refrigerant communication circuit operably couples the refrigeration power cell to the heat exchanger, conveying low pressure refrigerant therebetween. The refrigeration power cell comprises a compressor, a condenser, an expansion device, and an evaporator. The compressor, condenser, expansion device, and evaporator are serially coupled to form a high pressure closed refrigeration circuit.

The refrigeration power cell further comprises a drive mechanism coupled to the compressor. This drive mechanism may be a hydraulic motor, an electric motor, or other appropriate device to allow remote operation from the engine compartment. Alternatively, the compressor may be belt driven in a conventional manner.

In an embodiment of the instant invention, the low pressure refrigerant communication circuit thermally interfaces with the condenser to remove heat from the high pressure closed refrigeration circuit. In this embodiment this heat exchanger is adapted to mount in proximity to a radiator in an engine compartment of an over-the-road or off-road vehicle.

Alternatively, the low pressure refrigerant communication circuit thermally interfaces with the evaporator to remove heat from the low pressure refrigerant. In this alternative embodiment the heat exchanger is adapted to mount under a dashboard of an over-the-road or off-road vehicle. Preferably, this embodiment of the instant invention further comprises a second heat exchanger remotely located from the refrigeration power cell, and a second low pressure refrigerant communication circuit which is operably coupled to the refrigeration power cell and to the second heat exchanger for conveying second low pressure refrigerant therebetween. In this embodiment the second low pressure refrigerant communication circuit thermally interfaces with the condenser to remove heat from the high pressure closed refrigeration circuit. Ideally, this second heat exchanger is adapted to mount in proximity to a radiator in an engine compartment of an over-the-road or off-road vehicle.

These and other objects and advantages of the invention will become more apparent from the following detailed description when taken in conjunction with the accompanying drawings.

Figure 1:
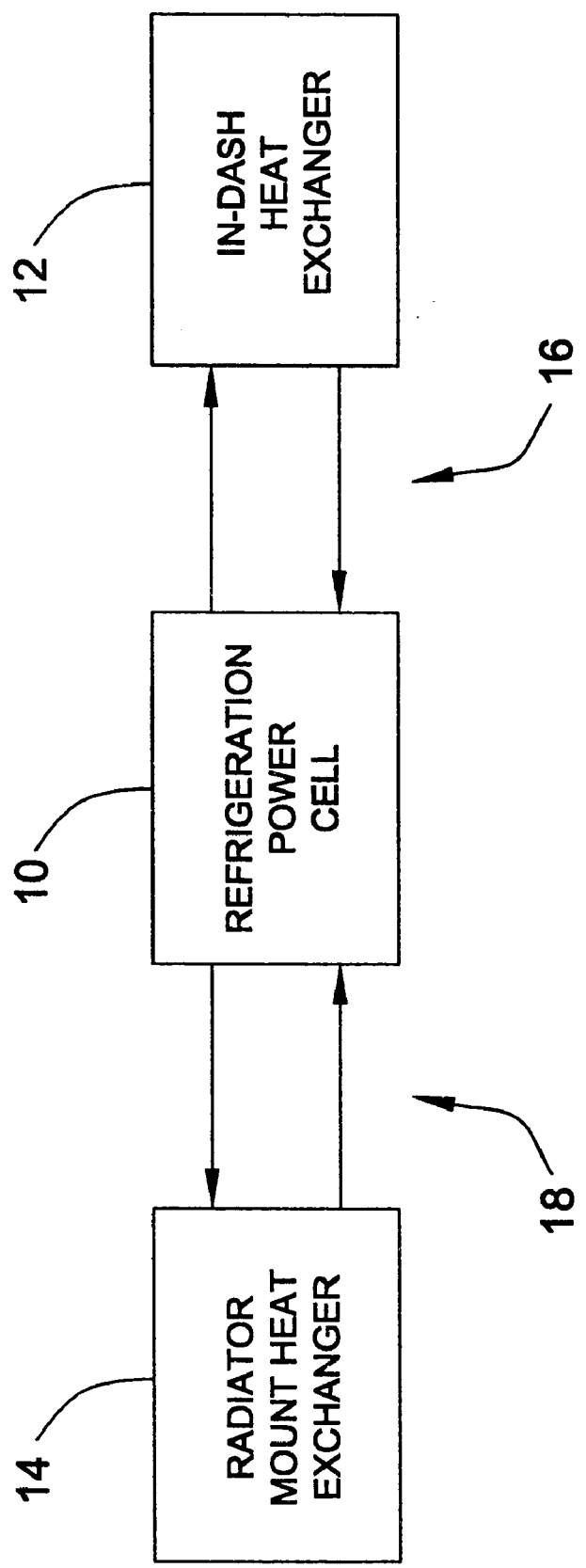
FIG. 1 is a system block diagram illustrating an embodiment of the instant invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

In a preferred embodiment of the instant invention as illustrated in FIG. 1, a modular low pressure delivery vehicle air conditioning system comprises a refrigeration power cell 10 which may be located anywhere room allows within or without the over-the-road or off-road vehicle. This refrigeration power cell 10 is a modular self-contained unit and comprises a high pressure refrigeration circuit having permanent connections between components as will be described more fully hereinbelow. In a preferred embodiment of the instant invention, the level of modularization of the system is total and includes an in-dash heat exchange unit 12 and a radiator mounted heat exchanger 14. Each of these heat exchangers 12, 14 are in thermal communication with the refrigeration power cell by low pressure refrigerant communication means 16, 18.

As described above, an over-the-road or off-road vehicle includes an occupant cabin for the driver and passenger to sit, and possibly an occupant sleeper cabin which provides a bunk area for the driver or occupant to sleep while not driving the vehicle. As is conventional, the occupant cabin includes a dashboard having, among other things, air vents located therein. Typically, a vent fan is included behind the dashboard to force air through the dash mounted vents into the occupant cabin. In a preferred embodiment of the instant invention, the in-dash heat exchanger 12 is configured or adapted to mount behind the dashboard within the occupant cabin. The operation of this in-dash mounted heat exchanger will be described more fully below with reference to FIG. 2.

Also as described briefly above, an over-the-road or off-road vehicle includes an engine compartment which typically houses the vehicle's main drive engine as well as other accessory components. One such accessory component is the vehicle's radiator through which engine refrigerant typically circulates to remove heat from the vehicle's engine. Typically, an engine fan is also included behind the radiator to draw air thereacross to aid in the heat removal process, especially when the vehicle is not moving. In a preferred embodiment of the instant invention, the radiator mounted heat exchanger 14 is configured or adapted to allow mounting on or in proximity to the radiator such that air which enters the engine compartment or which is drawn therein by the engine fan will flow across this heat exchanger 14 to also remove heat therefrom. A further description of the operation of this heat exchanger will be made with reference to FIG. 2.

As described above with regard to the background of the invention, one of the problems existing in the art pertains to the physical space requirements of an air conditioning system if placed within the engine compartment of an over-the-road or off-road vehicle. These engine compartments are typically quite crowded with the engine and accessory components which are required to be located in this same area. However, with the embodiment of the instant invention as illustrated in FIG. 1, the refrigeration power cell 10 is a self-contained, closed, modular unit which may be located remotely from the engine compartment, mounted within the vehicle or externally thereto.

However, as described above, one of the problems associated with distributing the components of the air conditioning system from the in-dash delivery of cooled air is that the high pressure refrigerant typically leaks from the system at the various high pressure couplings required to route this high pressure refrigerant to the various required areas within the vehicle. The instant invention obviates this problem by utilizing low pressure refrigerant which is circulated to the heat exchangers 12, 14 by a low pressure refrigerant communication circuits 16, 18 respectively. These low pressure refrigerant communication circuits 16, 18 are in thermal communication with the high pressure refrigeration power cell 10 but do not suffer from the same high pressure refrigerant leak problem as a typical system. In this way, the refrigeration power cell 10 is able to be located in any convenient remote location on or in the vehicle without concern for the number of couplings required to place the heat exchangers 12, 14 in their preferred locations.

Figure 2:
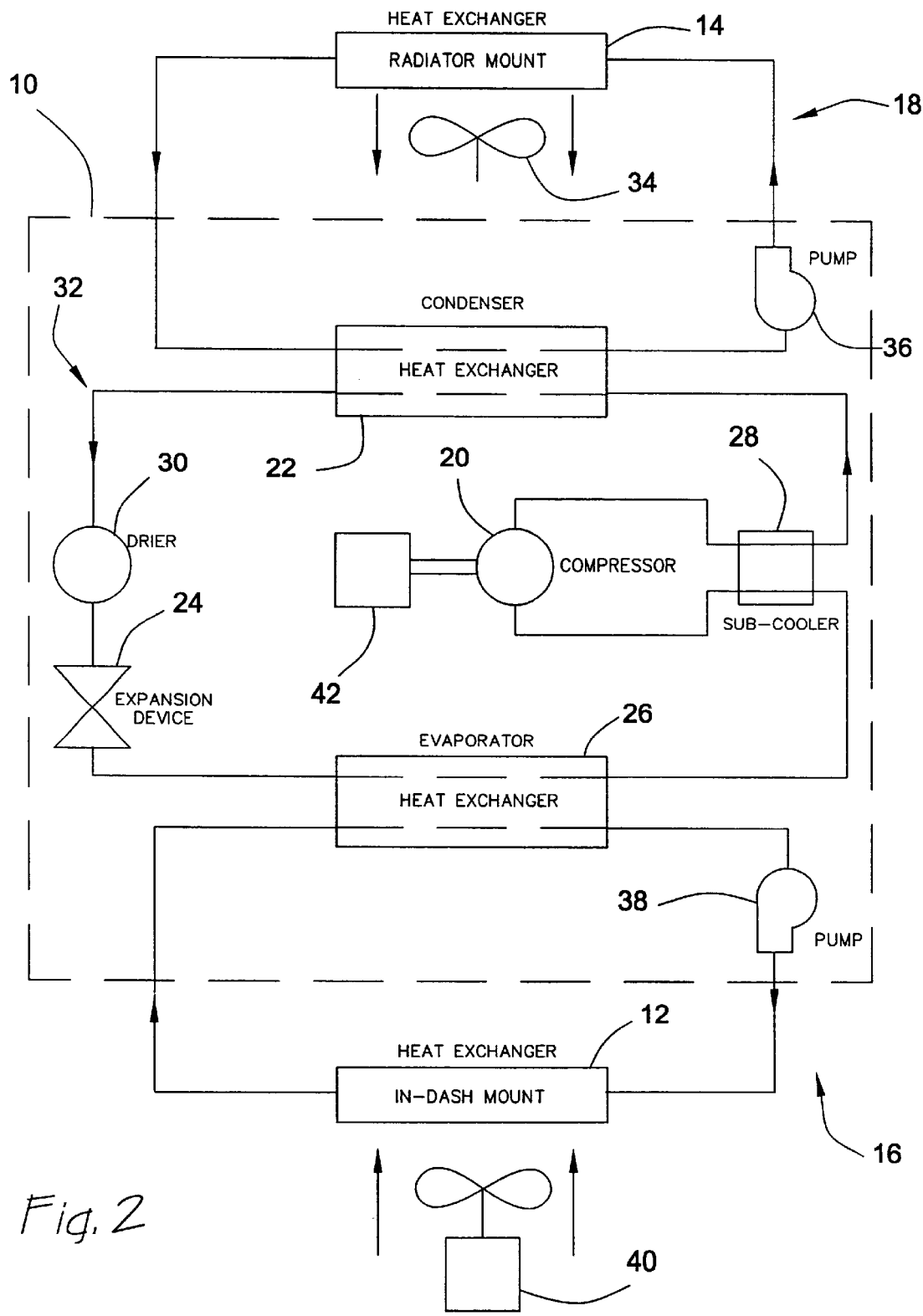
FIG. 2 is an expanded system block diagram of the embodiment of the instant invention illustrated in FIG. 1.

FIG. 2 illustrates in greater detail the embodiment of the instant invention illustrated in simplified block diagrammatic form in FIG. 1. As may be seen from FIG. 2, the refrigeration power cell 10 comprises a high pressure condenser based refrigeration circuit having a compressor 20, a condenser 22, an expansion device 24, and an evaporator 26. These components operate to form a high pressure closed refrigeration circuit, the specific operation of which is well known in the art.

However, unlike prior high pressure refrigeration systems, the components of the refrigeration power cell 10 are coupled by fixed tubing having permanent connections, such as soldered, braised, etc., connections, as opposed to releasable connectors which are typical in prior systems. This fixed tubing and permanent connections allow for the refrigeration power cell 10 to be a highly reliable essentially leak proof system which does not suffer from the problems of prior vehicle air conditioning systems of allowing high pressure refrigerant to leak through the various removable connections between components. Preferably, this refrigeration power cell will be a prepackaged and pre-charged unit which may be installed in the vehicle without concern for evacuating and charging of the air conditioning system at the manufacturing assembly facility of the vehicle as is common with prior systems.

The refrigeration power cell 10 may also include, in the high pressure refrigeration circuit, a sub-cooler 28 which thermally associates the low temperature input to the compressor containing vaporized refrigerant with the high temperature compressor output containing high temperature compressed refrigerant. In this way, the efficiency of the compressor is greatly increased as the high temperature liquid refrigerant in the compressor output is used to heat the refrigerant vapor flowing into the compressor, while at the same time the low temperature vapor in the compressor input is used to cool the compressed refrigerant flowing to the condenser. Additionally, a conventional dryer 30 may be included in the high pressure refrigeration circuit of the refrigeration power cell 10 to remove water from the circuit. While the use of such a dryer 30 is typically not needed in a totally closed high pressure refrigeration circuit, if the compressor 20 utilized in the circuit includes a seal, the use of the dryer 30 is preferred.

Unlike a conventional high pressure refrigeration circuit which places the condenser 22 in proximity to the radiator of the vehicle to remove heat from the high pressure refrigeration circuit, the condenser 22 of the instant invention is not positioned remotely from the other components of the refrigeration power cell 10. Instead, the condenser 22 of this embodiment of the instant invention serves as a heat exchanger between the high pressure refrigeration circuit 32 and the low pressure refrigerant circuit 18 which circulates low pressure refrigerant to a radiator mounted heat exchanger 14. In this way, heat generated by the high pressure refrigeration circuit 32 is removed to the low pressure refrigerant circuit 18 and circulated to the radiator mounted heat exchanger 14. As the engine fan 34 operates, air is drawn across the heat exchanger 14 thereby removing heat from the low pressure refrigerant circulating therethrough. As is conventional, the fan need not operate while the vehicle is traveling, as normal air flow through the engine compartment may serve to remove sufficient heat from the heat exchanger 14 to obviate the necessity of running the engine fan 34.

The means 18 for this low pressure refrigerant communication may utilize simple, inexpensive, insulated tubing such as that utilized for a low pressure heating system. To coordinate with the low pressure refrigerant communication means 18, the refrigeration power cell 10 includes a low pressure refrigerant circulation means which includes the low pressure couplings to interface with the low pressure tubing, as well as a low pressure refrigerant pump 36. This pump 36 is utilized to circulate the low pressure refrigerant through the low pressure circuit which includes the heat exchanger 14 and the condenser heat exchanger 22. As will be recognized by one skilled in the art, while the heat exchanger 14 has been described in a radiator mount configuration, the heat exchanger 14 may actually be mounted in any convenient location having sufficient air flow to remove heat from the heat exchanger 14.

The high pressure refrigeration refrigerant circuit 32 of the refrigeration power cell 10 also deviates from a typical high pressure refrigeration circuit by utilizing its evaporator 26 to cool the low pressure refrigerant circuit 16 as opposed to directly cooling the air in the cabin. Instead, the high pressure refrigeration circuit 32 of the instant invention is utilized as a heat exchanger which extracts heat from the low pressure refrigerant circulating in the circuit 16. As with the configuration described above, the refrigeration power cell 10 includes a low pressure refrigerant circulation means including low pressure fittings and a low pressure refrigerant pump 36 which circulates the low pressure refrigerant through the low pressure communication circuit 16, the heat exchanger 12, and the evaporator heat exchanger 26.

Unlike a conventional system which utilizes a dashboard mounted evaporator, the system of the instant invention utilizes the evaporator 26 to serve as a heat exchanger cooling the low pressure refrigerant circulating therethrough. As this low pressure refrigerant is circulated through the low pressure tubing to the in-dash mounted heat exchanger 12, the vent fan 40 blows air thereacross, through the air vents located in the dashboard, and into the occupant cabin to cool the air therein. Since this system is circulating low pressure refrigerant, the distance and number of couplings from the refrigeration power cell 10 to the dashboard of the vehicle is not a concern, unlike systems which attempt to circulate high pressure refrigerant as is typical.

The operation of the compressor 20 in the refrigeration power cell 10 may be driven by a suitable drive means 42 which is included as part of the refrigeration power cell 10. In this way, the refrigeration power cell 10 may be a totally self-contained modular unit capable of being located anywhere within or outside of the vehicle. Devices which may be utilized to drive the compressor 20 include electric or hydraulic motors, or other appropriate drive mechanisms. If the refrigeration power cell is to be located within the engine compartment, or in proximity to other rotating elements, a shaft or belt drive may be utilized as appropriate and desired.

As will be recognized by one skilled in the art, the use of the self-contained refrigeration power cell 10 eliminates the need for separate refrigeration hoses or tubing, thereby reducing the cost of the manufacture of this system. The absence of hoses and their required connections also greatly reduces the possibility of refrigeration leaks in the high pressure refrigeration circuit 32, thereby reducing the cost of ownership and providing enhanced benefits to the environment. Since the components are located in close proximity to one another within the refrigeration power cell 10, the system is inherently more efficient and utilizes a reduced volume of refrigerant, once again reducing the cost of the system. Since this unit is modular, it is easy to install within the vehicle which reduces the cost of manufacturing the vehicle. Additionally, since the refrigeration power cell 10 is a self-contained unit, it may be delivered to the vehicle assembly plant fully charged with refrigerant, thereby obviating the need for evacuation or charging during the installation of the unit within the vehicle. This not only greatly reduces the cost of manufacturing of the vehicle, but also relieves the assembly plant from various government regulations which govern the handling and installation of refrigerant.

Figure 3:
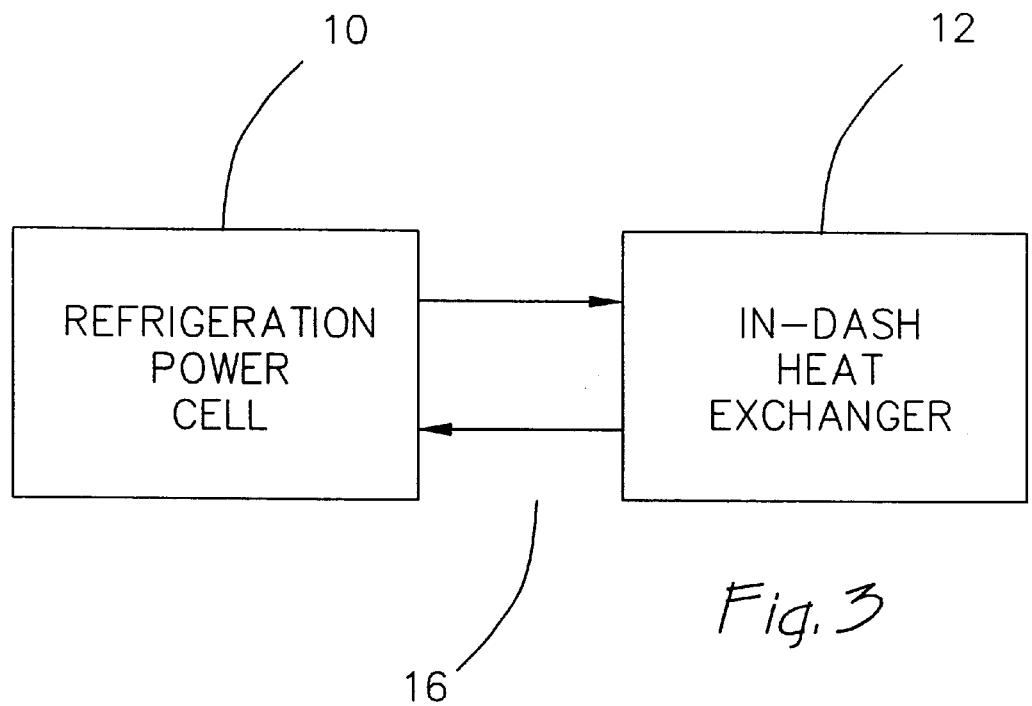
FIG. 3 is a system block diagram illustrating an alternate embodiment of the instant invention.

An alternate embodiment of the instant invention is illustrated in FIG. 3. As may be seen with reference to this FIG. 3, the refrigeration power cell 10 interfaces solely with an in-dash heat exchanger 12 via a low pressure refrigerant communication circuit 16. In this embodiment of the instant invention, the need for a separate low pressure circuit and heat exchanger 14 (see FIG. 1) is obviated by the location of the refrigeration power cell 10 within the vehicle. Particularly, if the refrigeration power cell is located in an area which receives sufficient airflow to cool the high pressure refrigeration circuit 32 (see FIG. 4) then a separate low pressure refrigerant circuit to perform this function is not required.

Figure 4:
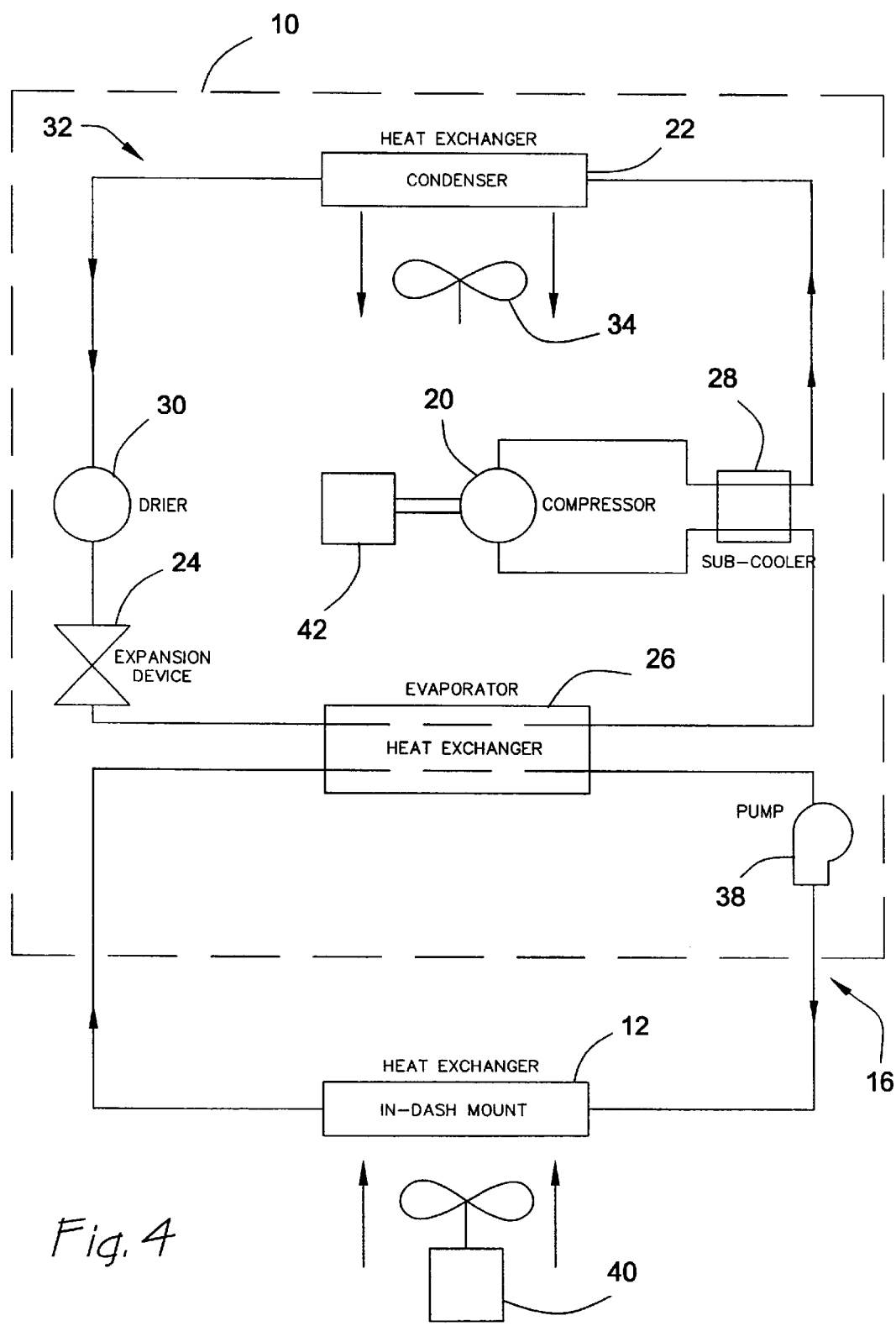
FIG. 4 is an expanded system block diagram of the alternate embodiment of the instant invention illustrated in FIG. 3.

With specific reference to FIG. 4, this embodiment of the instant invention utilizes the condenser 22 in a more conventional fashion as a direct heat exchange element for the high pressure refrigeration circuit 32. This configuration may be appropriate where, for example, the refrigeration power cell 10 is located within the engine compartment and may utilize the airflow generated by the movement of the vehicle and/or the engine fan 34. Alternatively, this configuration may be appropriate when the refrigeration power cell 10 is located externally to the vehicle in a location which receives sufficient airflow across the condenser 22 to provide adequate heat removal from the high pressure refrigeration circuit 32. The inclusion of a fan to aid air flow may be appropriate to enhance performance.

Figure 5:
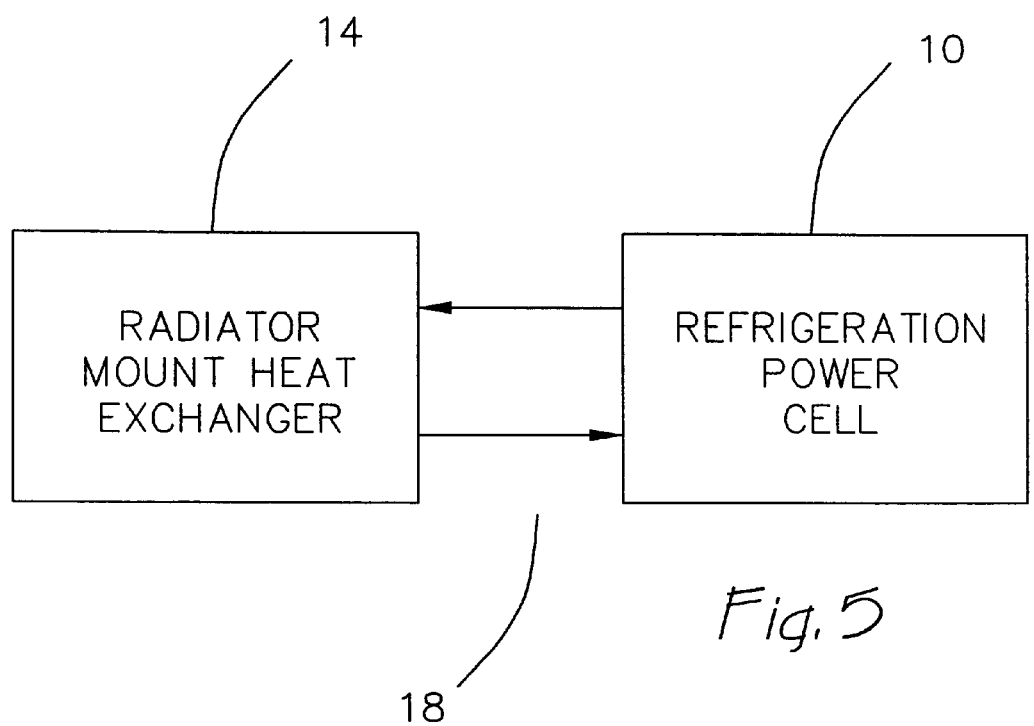
FIG. 5 is a system block diagram illustrating a further alternate embodiment of the instant invention.
Figure 6:
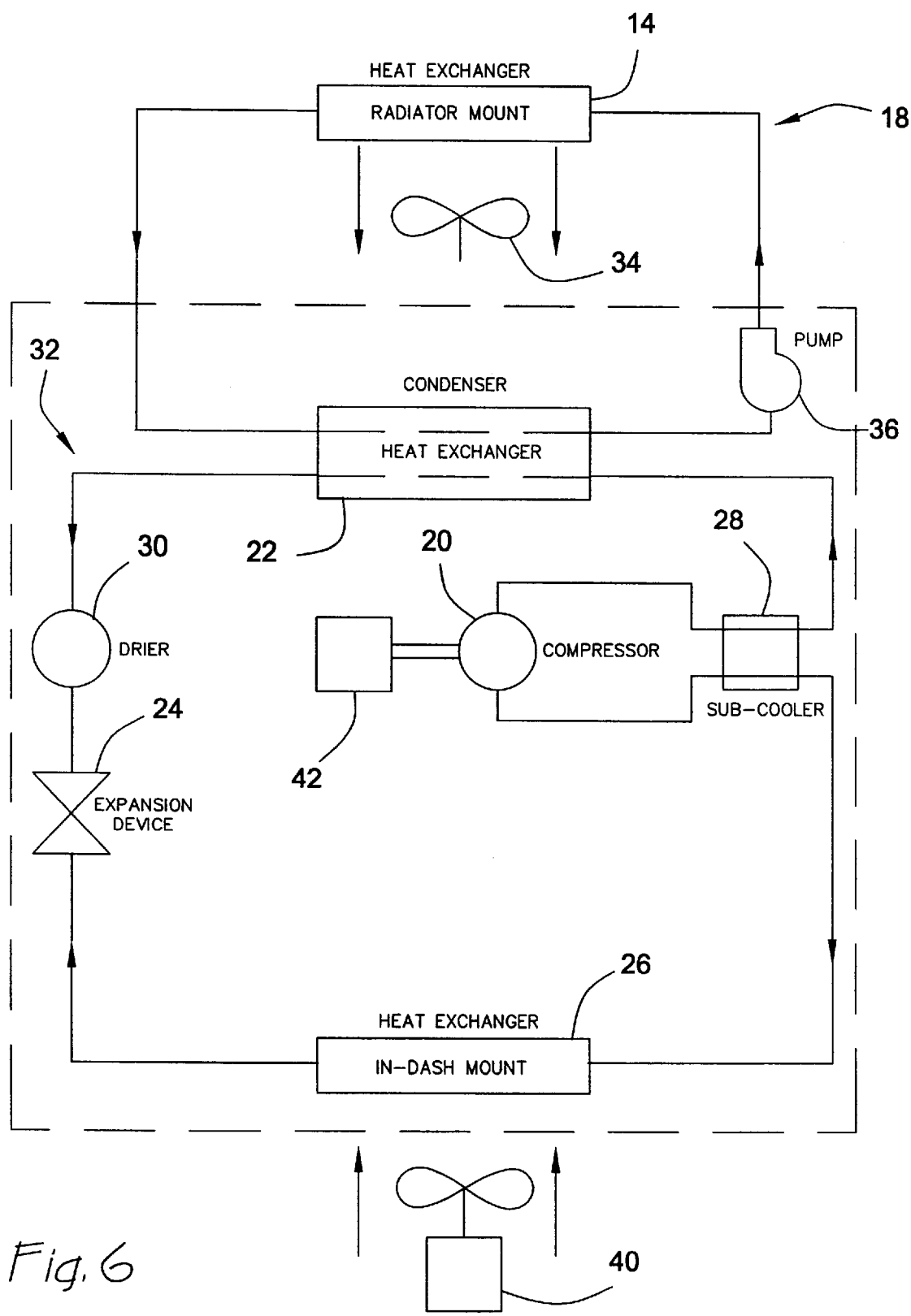
FIG. 6 is an expanded system block diagram of the further alternate embodiment of the instant invention illustrated in FIG. 5.

Alternatively, as illustrated in FIG. 5, the location and configuration of the refrigeration power cell 10 may obviate the need for a separate in-dash heat exchanger 12 (see FIGS. 1 and 3), and may only need to utilize a separate remotely located heat exchanger 14 to cool the high pressure refrigeration circuit 32 (see FIG. 6). This particular configuration, as illustrated in greater detail in FIG. 6, utilizes the evaporator 26 of the high pressure refrigeration circuit 32 in a more conventional manner by providing direct heat exchange to the cabin air as delivered by the vent fan 40. Such a configuration is appropriate when the refrigeration power cell is configured to mount within the vehicle's occupant cabin so that direct heat exchange to the cabin air is appropriate across the evaporator 26. In such a configuration, the heat generated by the high pressure refrigeration circuit must still be removed through the condenser by the low pressure refrigerant circuit 18 to the remotely located heat exchanger 14 described above. As will be recognized by one skilled in the art, while the heat exchanger 14 has been described with regard to a proximity mounting with the engine radiator, one skilled in the art will recognize that any remote location of this heat exchanger 14 in an area having sufficient air flow to accomplish the requisite heat removal from the system is appropriate. Likewise, one skilled in the art will also recognize that the reference to in-dash mounted heat exchangers, while a conventional configuration for an air conditioning system within an over-the-d or off-road vehicle, is not limiting as alternate configurations such as floor or ceiling mounted vents are also appropriate and included within the scope of the instant invention.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. The details of the structure and architecture may be varied substantially without departing from the spirit of the invention, and the exclusive use of all modifications which come within the scope of the appended claims is reserved.

What is claimed is:

1. An air conditioning system for an over-the-road or off-road vehicle having an engine located in an engine compartment and an occupant cabin, the occupant cabin having a dashboard including air flow vents and a vent fan included therein, the system comprising:
   a refrigeration power cell including a high pressure condenser-based refrigeration circuit having a compressor, condenser, expansion device, and evaporator serially coupled by fixed tubing having permanent connections;
   a first heat exchanger adapted to be mounted in the dashboard of the occupant cabin; and
   low pressure refrigerant communication tubing for operably coupling said first heat exchanger to said refrigeration power cell.

2. The system of claim 1, wherein said refrigeration power cell further comprises:
   a low pressure circulation pump for supplying low pressure refrigerant to said low pressure refrigerant communication tubing; and
   wherein said evaporator and said circulation pump are in thermal communications whereby heat is removed from the first low pressure refrigerant.

3. The system of claim 2, wherein said evaporator and said circulation pump are coupled by fixed low pressure tubing having permanent connections.

4. The system of claim 1, wherein said refrigeration power cell is located completely in the engine compartment.

5. The system of claim 4, wherein the engine compartment and the occupant cabin are separated by a firewall, the system further comprising low pressure couplings penetrating the firewall and interposed in said low pressure refrigerant communication tubing to facilitate penetration of the firewall thereby.

6. The system of claim 4, wherein said refrigeration power cell is fully charged with high pressure refrigerant prior to location thereof in said engine compartment.

7. The system of claim 4, wherein said refrigeration power cell is located in operable proximity to an engine fan to remove heat from said refrigeration power cell.

8. A modular air conditioning system, comprising:
   a self-contained refrigeration power cell including a high pressure compressor and an evaporator coupled in series by fixed tubing having permanent connections;
   a first heat exchanger remotely located from said refrigeration power cell; and
   a low pressure refrigerant communication circuit operably coupled to said refrigeration power cell and to said first heat exchanger, said low pressure refrigerant communication circuit adapted to convey low pressure refrigerant therebetween.

9. The system of claim 8, wherein said refrigeration power cell further comprises:
   a condenser; and
   an expansion device; and
   wherein said compressor, condenser, expansion device, and evaporator are serially coupled by said fixed tubing having permanent connections to form a high pressure closed refrigeration circuit.

10. The system of claim 9, wherein said compressor is adapted to be driven by a hydraulic motor or an electric motor.

11. The system of claim 9, wherein said low pressure refrigerant communication circuit thermally interfaces with said evaporator via a removable connection to remove heat from the first low pressure refrigerant, and wherein said first heat exchanger is adapted to mount under a dashboard of a vehicle.

12. The system of claim 8, wherein said refrigeration power cell is located completely in an engine compartment of a vehicle and said.

13. The system of claim 12, wherein the engine compartment and an occupant cabin of the vehicle are separated by a firewall, the system further comprising low pressure couplings penetrating the firewall and interposed in said low pressure refrigerant communication tubing to facilitate penetration of the firewall thereby.

14. An air conditioning system for an over-the-road or off-road vehicle, comprising:

a high pressure refrigeration power cell utilizing fixed high pressure tubing; and at least one low pressure refrigeration circuit in removable thermal communication with said high pressure refrigeration power cell, said low pressure refrigeration circuit including a heat exchanger for transmitting thermal energy communicated from said high pressure refrigeration power cell.

15. The system of claim 14, wherein said high pressure refrigeration power cell comprises:

a compressor;

an evaporator a condenser; and an expansion device; and wherein said compressor, evaporator, condenser, and expansion device are coupled in series by said fixed high pressure tubing utilizing permanent connections.

16. The system of claim 14, wherein said high pressure refrigeration power cell is located within an engine compartment of the over-the-road or off-road vehicle.

17. The system of claim 16, wherein said high pressure refrigeration power cell is fully charged with high pressure refrigerant prior to being located in the engine compartment.

* * * * *